US008626401B2

(12) United States Patent  
Tomich

(10) Patent No.: US 8,626,401 B2  
(45) Date of Patent: Jan. 7, 2014

(54) CULTIVATION SYSTEM AND A SUBSOIL TOOL

(76) Inventor: Randal Tomich, Unley (AU)

( * ) Notice: Subject to any disclaimer, the term of this patent is extended or adjusted under 35 U.S.C. 154(b) by 759 days.

(21) Appl. No.: 12/866,138

(22) PCT Filed: Feb. 5, 2008

(86) PCT No.: PCT/AU2008/000137  
§ 371 (c)(1),  
(2), (4) Date: Aug. 4, 2010

(87) PCT Pub. No.: WO2009/097641  
PCT Pub. Date: Aug. 13, 2009

(65) Prior Publication Data  
US 2011/0010314 A1 Jan. 13, 2011

(51) Int. Cl.  
A01B 79/00 (2006.01)  
A01B 11/00 (2006.01)  
A01B 13/08 (2006.01)  
E02F 5/32 (2006.01)  
E02F 9/28 (2006.01)  
G06Q 99/00 (2006.01)  
G06F 19/00 (2011.01)

(52) U.S. Cl.  
USPC .................................. 701/50; 702/5

(58) Field of Classification Search  
USPC ......... 702/5; 701/50; 172/156, 196, 699, 700, 172/720, 721, 722, 724, 730  
See application file for complete search history.

(56) References Cited

U.S. PATENT DOCUMENTS

| 774,324 A | 11/1904 | Hill |
| 3,171,500 A | 3/1965 | Dils |
| 3,704,753 A | 12/1972 | Hasforth et al. |
| 4,538,689 A | 9/1985 | Dietrich |
| 4,828,041 A | 5/1989 | Cosson |
| 5,437,337 A | 8/1995 | Dietrich |
| 5,499,686 A | 3/1996 | Parker |
| 5,540,288 A | 7/1996 | Dietrich |
| 5,668,719 A | 9/1997 | Bobrov et al. |
| 6,178,900 B1 | 1/2001 | Dietrich |
| 6,443,237 B1 | 9/2002 | Myers et al. |
| 2003/0036852 A1 | 2/2003 | Ell et al. |

FOREIGN PATENT DOCUMENTS

| DE | 2647812 A1 | 4/1978 |
| RU | 2102844 C1 | 1/1998 |
| SU | 927918 A1 | 5/1982 |
| SU | 1011061 A | 4/1983 |
| SU | 1653554 A1 | 6/1991 |
| WO | WO03/024193 A1 | 3/2003 |

Primary Examiner — Christopher J Novosad  
(74) Attorney, Agent, or Firm — Bio Intellectual Property services (Bio IPS) LLC; O. M. (Sam) Zaghmout

(57) ABSTRACT

A method and system of tillage and tillage management that includes the steps of establishing a plurality of soil profiles over an area of soil to be cultivated, creating soil map database by combining these soil profiles to establish a treatment and cultivation regime, cultivating the ground in accordance regime and recording the cultivation in the soil map database. A subsoil tool for carrying out the method and system, with a shank (18) connected to a vehicle and to a ripper foot (20) terminating in a ripper tooth (22); a hydraulic ram (26) attached at a lower end to a first pivot connection (28) and at an upper end to an actuator the first pivot connection is attached to a rear end of a laterally extending wing member (30), a front end of the wing member being pivotally attached to the shank through a second pivot point (32) and the wing member is selected in accordance with soil profile at any position on a soil map database and is oscillated in response to actuation of the ram.

12 Claims, 7 Drawing Sheets

CULTIVATION SYSTEM AND A SUBSOIL TOOL

FIELD OF THE INVENTION

The invention relates to a system of establishment and management of cultivated ground. The present invention further relates to a tractor mounted tool carrier used to carry out treatment and cultivation regimes used in the establishment of cultivated areas. More particularly the invention relates to a tool carrier that finds its principal operation as an agricultural tillage tool and is additionally capable of a variety of further uses.

BACKGROUND OF THE INVENTION

Soil working and site preparation is important for the establishment sand survival of cultivated crops. In the absence of adequate soil preparation crops may struggle because of poor physical soil condition, in particular soil compaction. Compacted soils are not easily penetrated by plant root which may struggle to assimilate the water and nutrients needed for growth and production. In turn this leads to a general undesirable loss of plant vigour, and less than optimal performance. The condition of the soil is therefore a limiting factor on the production capacity of the area.

In general, soil ripping is conducted to improve soil condition and create a friable soil that roots of plants are able to penetrate and establish. The roots of any plant need to be encouraged so that they anchor the seedling and grow deep to access water and nutrients. However, current equipment used is not site specific. By contrast, the present invention allows for variability in the type of soil amelioration during use of the tool by reference to soil type and by reference to a soil map database.

Mounding is conducted in conjunction with or following ripping. In effect a raised, friable soil bed is created. This technique improves the benefits of ripping by enhancing water retention, greater soil depth and uniformity of crop.

Single pass tillage implements are known and have been used to perform both shallow and deeper tillage in a single pass. Single pass equipment provides considerable time efficiencies compared with conducting separate operations in multiple passes.

However, in any one area in which cultivation is to be established the soil condition and soil characteristics may vary considerably. Time taken to complete a task is frequently critical in the establishment of a cultivated area and it is hard for a land manager to make more than a relatively crude assessment of the variability of an area of land and of the varying requirement that the soil may have for treatment. The difficulty of this task is exacerbated by the fact that equipment used to perform these vital tasks is of a specialized nature.

In most cases the capital cost of equipment is considerable. This is particularly the case when the equipment is used on only a seasonal basis, or perhaps only as a once off in initial establishment of a cultivated area. Furthermore, the skills required to operate and maintain such equipment are typically beyond the available resources of most landholders. Accordingly, land cultivation is frequently carried out on a contract basis.

The present invention is directed to a system of soil cultivation management, providing a land holder with enhanced information concerning the soils, structure and soil working requirement and soil working history. In addition to soil characteristics, the present invention can build on this information by the addition of crop yield information. Thus, any soil initial amelioration plan produced may be amended in subsequent seasons to thereby encourage continuous improvement in crop yield and uniformity.

In addition, the inventor of the present invention has realized that modern agricultural practices often require a number of tools to be used in land cultivation and management. The present invention is therefore also directed to a tractor mounted tool carrier used to carry out treatment and cultivation regimes used in the establishment of cultivated areas. More particularly the invention relates to a tool carrier adapted for use with a variety of soil working tools directed to a variety of purposes.

SUMMARY OF THE INVENTION

Therefore according to a first aspect of the present invention there is provided a method and system of tillage and tillage management characterized in that it includes the steps of:
  establishing a plurality of soil profiles at pre-determined intervals in an array over an area of soil to be cultivated;
  combining the plurality of soil profiles for the area with positional information to thereby create a soil map database;
  using the soil map database to establish a treatment and cultivation regime, in the form of a soil amelioration plan, for the area based on the soil map database;
  cultivating the ground in accordance with the soil amelioration plan; and
  recording the cultivation in the soil map database.

Preferably, the method of the invention includes the further step of adding crop yield information to the soil profile and positional information in the soil map database, optionally generating an amended soil amelioration plan to be carries out in a subsequent season.

Soil information may include the information relating to physical chemical and environmental factors that affect soil performance, both at a surface and a sub surface level.

Soil information provides information relating to soil types, identifies any potential problems in the soil that require attention or amelioration to thereby improve soil characteristics and soil uniformity across a cultivated area.

A useful feature of the system of the present invention is the ability to record and recall historical treatment and cultivation regimes for an area of soil under cultivation. In a preferred form of the invention, the recorded treatment and cultivation regime data includes information relating to soil working implements and types used fertilizer applications data, and crop yields or production data. In a particularly preferred form of the invention the system is adapted for customization to record data as selected by and end user.

A further useful feature of the invention is the combination of the soil map database with the soil working equipment.

The tillage system of the present invention is conducted by the use of a novel subsoil implement. Accordingly, the present invention is additionally directed to a subsoil tool characterized in that said subsoil tool is adapted for connection to a support vehicle, said tool having:
  a shank, said shank having at an upper end thereof means for connection to a vehicle and at its lower end the shank being connected to a ripper foot terminating in a ripper tooth;
  a hydraulic ram, said ram being is generally with the shank, and said ram being attached at a lower end thereof to a first pivot connection and at an upper end the ram being attached to an actuator means;

wherein the first pivot connection at the lower end of the ram is attached to a rear end of a laterally extending wing member, a front end of the wing member being pivotally attached to the shank through a second pivot point; and whereby the wing member is oscillated in response to actuation of the ram, and wherein the wing member is removable, and wherein a wing member is selected in accordance with an established soil profile at any position relative to the soil map database.

Preferably, the shank includes on its leading edge a replaceable wear plate.

Preferably, the means to drive the foot in oscillatory motion about the pivotal connection takes the form of a hydraulic or pneumatic connection. In a preferred embodiment of the invention the hydraulic ram connection is attached to a rear of the foot and is aligned, in general terms, with the shank, operating the oscillation by means of reciprocating motion. In one form of the invention, the subsoil tool is designed to have an adjustable operation between 0.5-2 Hertz and at a depth below the soil surface of up to 2 m.

The subsoil implement of the present invention is designed to be used in a wide range of soils having natural and/or man made impeding layers, contrasting layers or pans that restrict root and water penetration at a depth as required by the soil map database. The effect of soil tillage by the subsoil implement of the invention is to encourage sustainable production through the combined effects of faster water infiltration and permeability, strong root growth, increased water and nutrient availability, improved drainage and aeration, leaching of salts and toxins and lower soil strength. Importantly, the subsoil tool of the present invention, working in conjunction with data available from the soil map database is able to work and ameliorate soil in such as way to make topsoil and/or ameliorated soil profile depths more uniform across a worked area. Thus, for example, the soil profile and soil map database my identify, in an area to be treated, layers of surface soil of varying depth, the surface soil overlying lime soils, again varying in depth across the ground to be treated. The combination of the subsoil tool operating in conjunction with a soil map database allows the soil to be worked in such a manner as to limit any undesirable incorporation of the lime soil into other wise good soil, and to promote a more uniform soil profile over the ground. In subsequent seasons the preparation of a further soil plan for the ground is therefore able to take into account the affects, and improvements, of soil amelioration undertaken to date.

Preferably, the subsoil implement of the invention has laterally extending wings attached thereto, the wings serving to increase the width of action of the tool and thereby to increase the amount of fragmentation of the soil by the tool. The wings attached to the implement are removable, and the geometry of any wing to be used is selected in accordance with the soil amelioration plan generated and from the information contained in the soil map database.

In various embodiments of the invention, the wings may be adjustable, in both the horizontal and vertical planes preferably in the range between 5° and 50°.

Preferably, the subsoil tool of the invention is attached to a conventionally driven tractor by means of a quadrilateral parallelogram frame.

DESCRIPTION OF DRAWINGS

The above and other objects, features, and advantages of the present invention will be apparent from the following detailed description of a preferred embodiment in conjunction with the accompanying drawings. In the drawings.

DESCRIPTION OF THE PREFERRED EMBODIMENT

Figure 1:
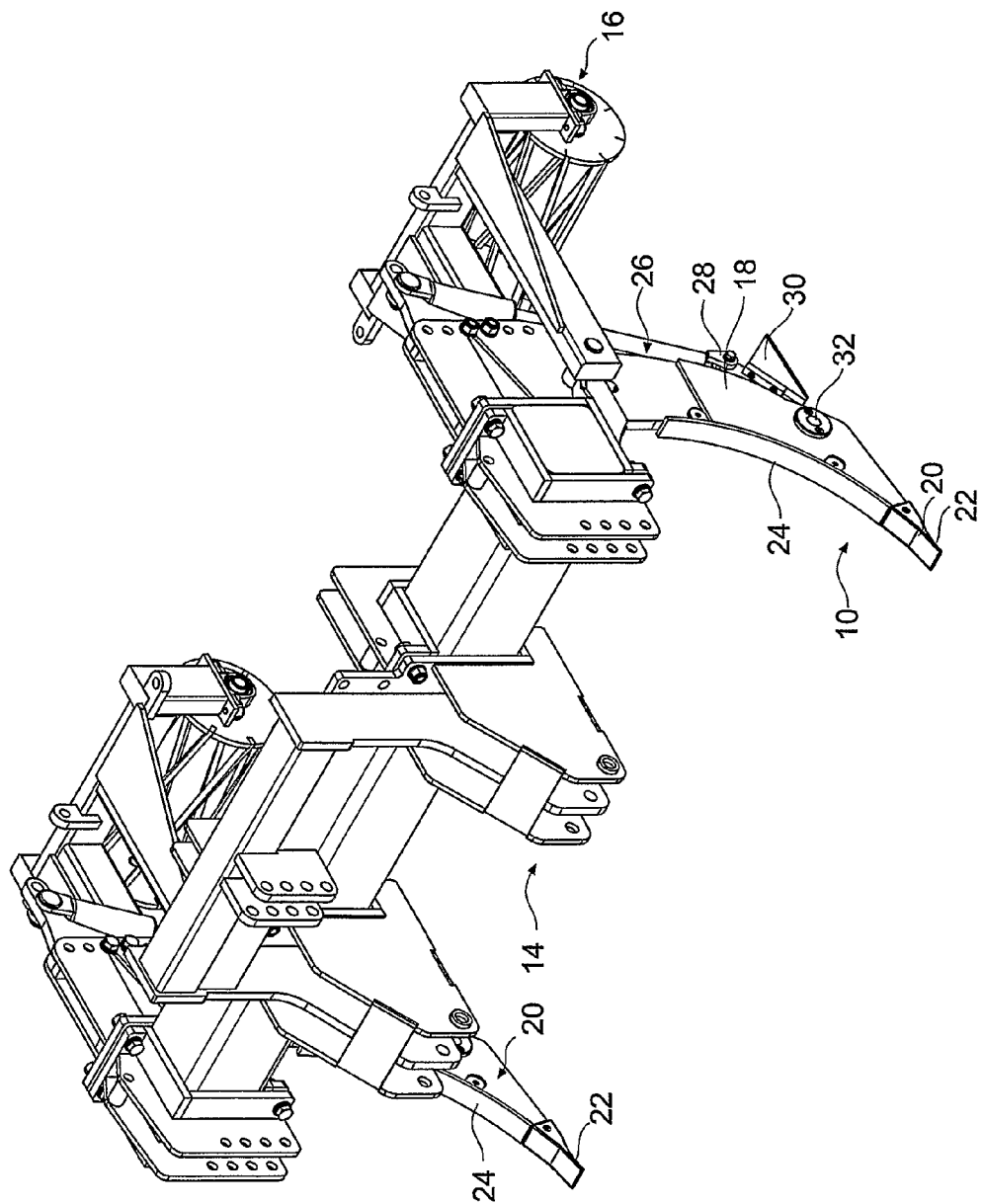
FIG. 1 illustrates soil tillage equipment used in connection with the present invention in a first perspective view.
Figure 2:
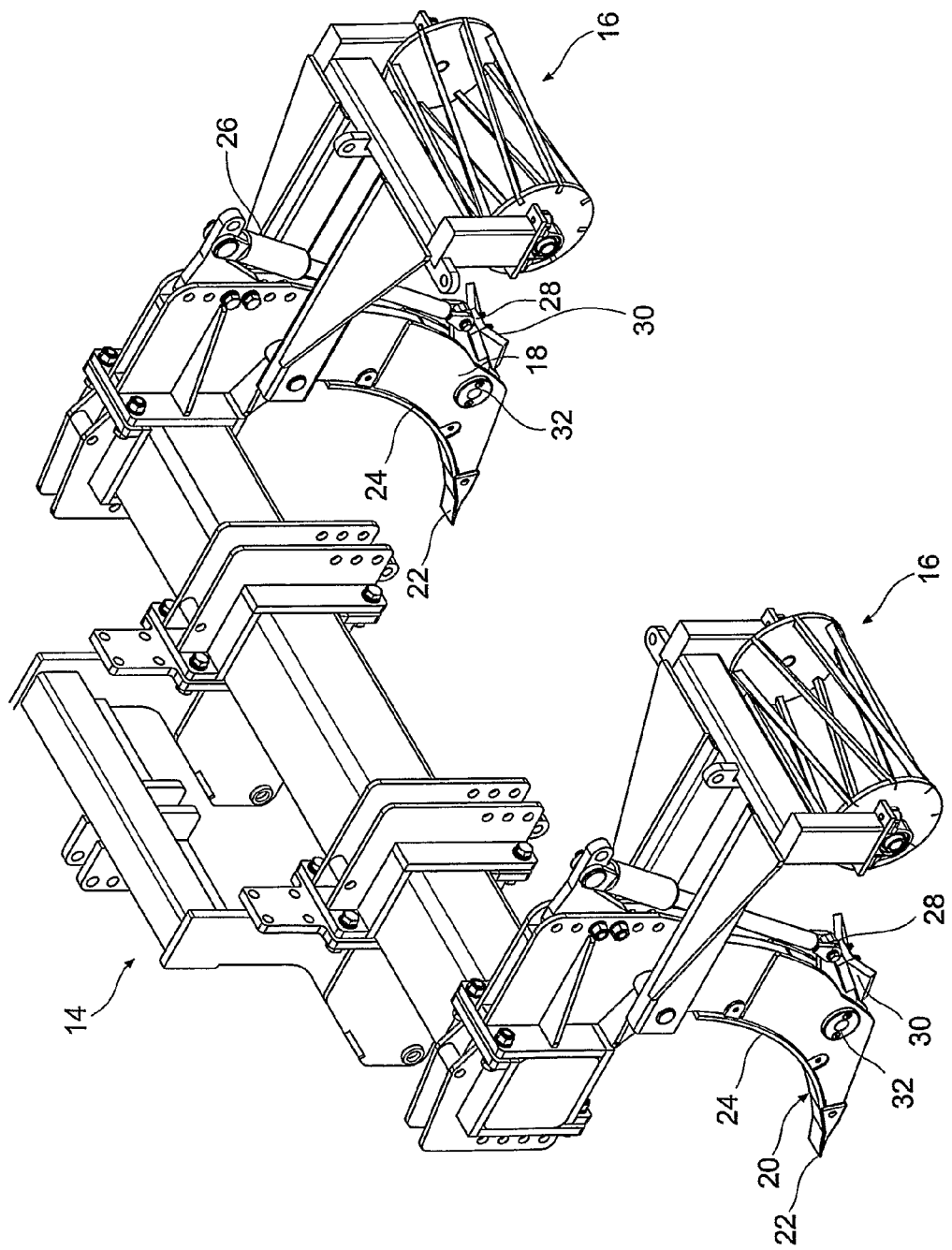
FIG. 2 illustrates soil tillage equipment used in connection with the present invention in a second perspective view.
Figure 3:
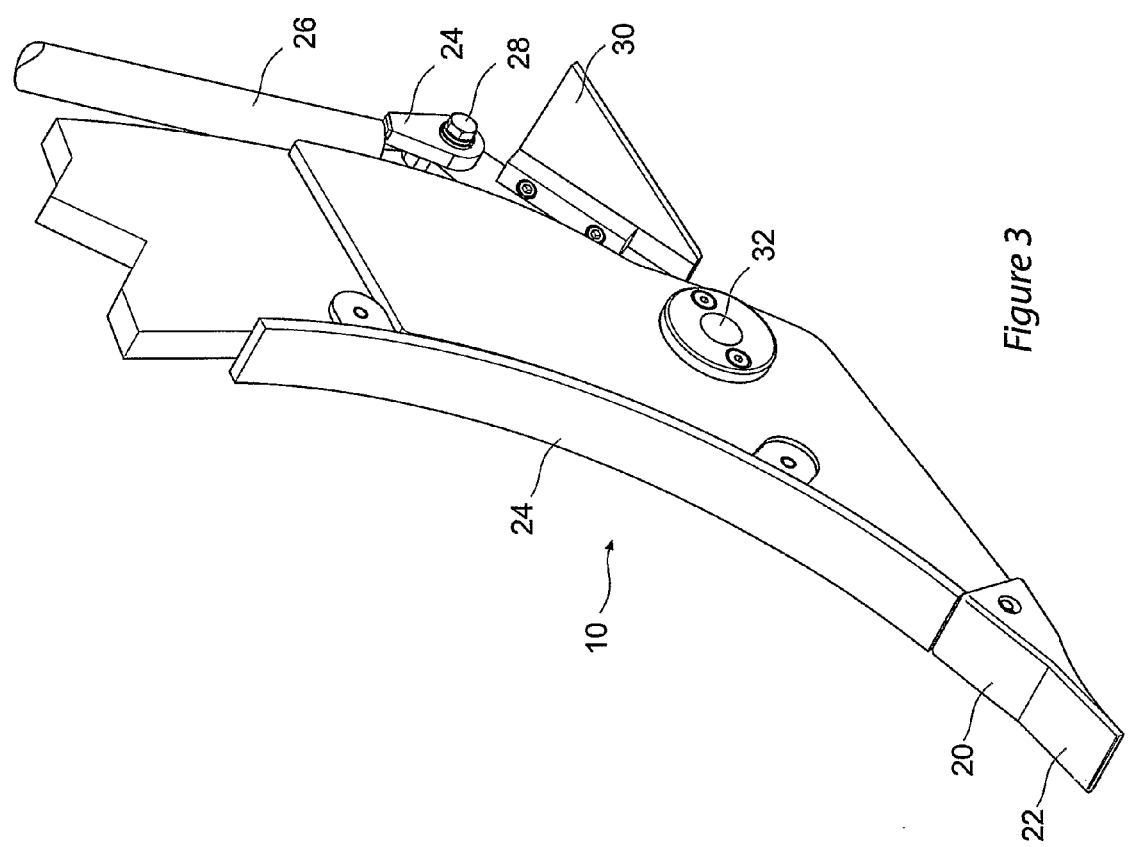
FIG. 3 illustrates in detail a foot incorporating a vibrating ripper used in the tillage system and apparatus of the present invention.
Figure 4:
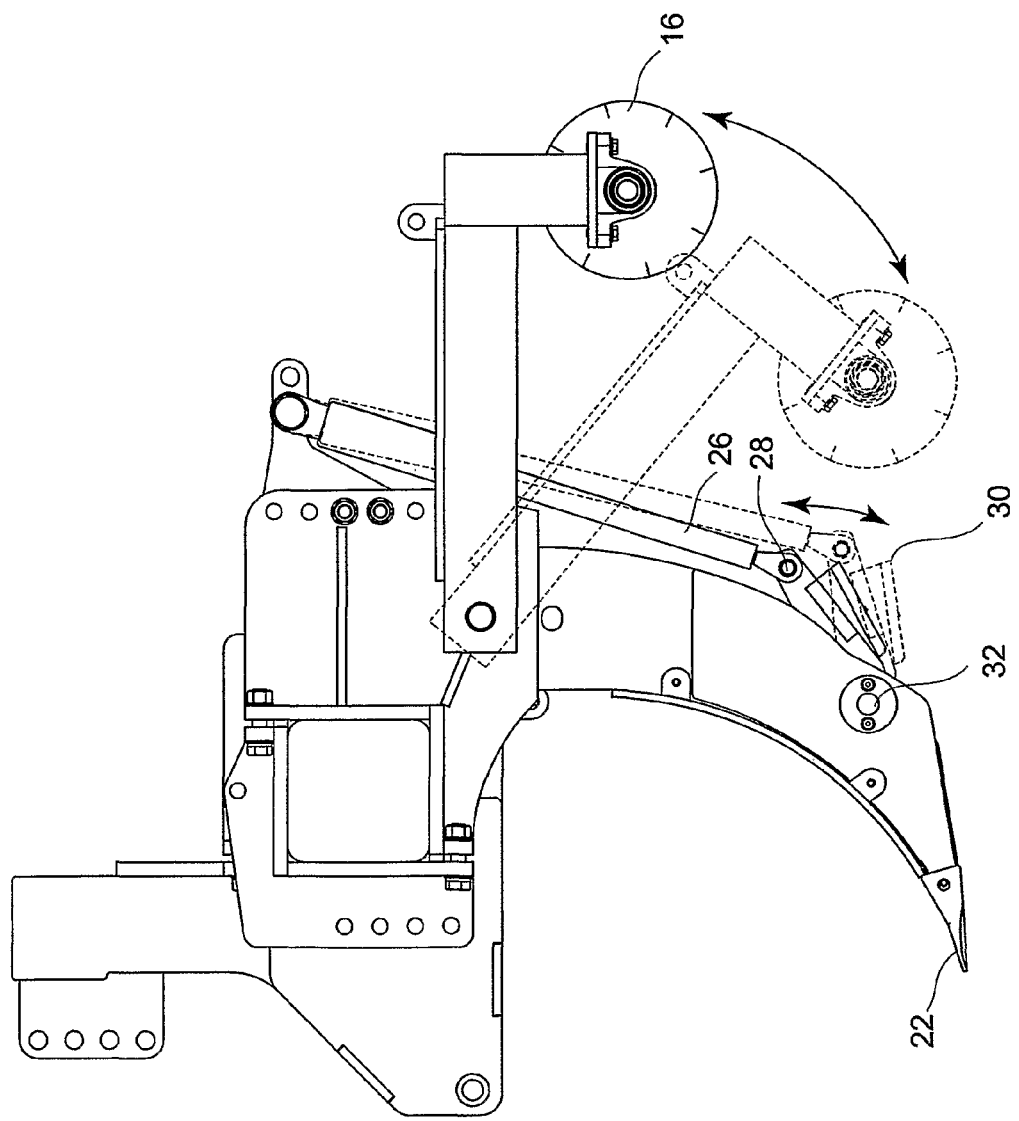
FIG. 4 shows in side profile the operation of the vibrating ripper of FIG. 3.
Figure 5:
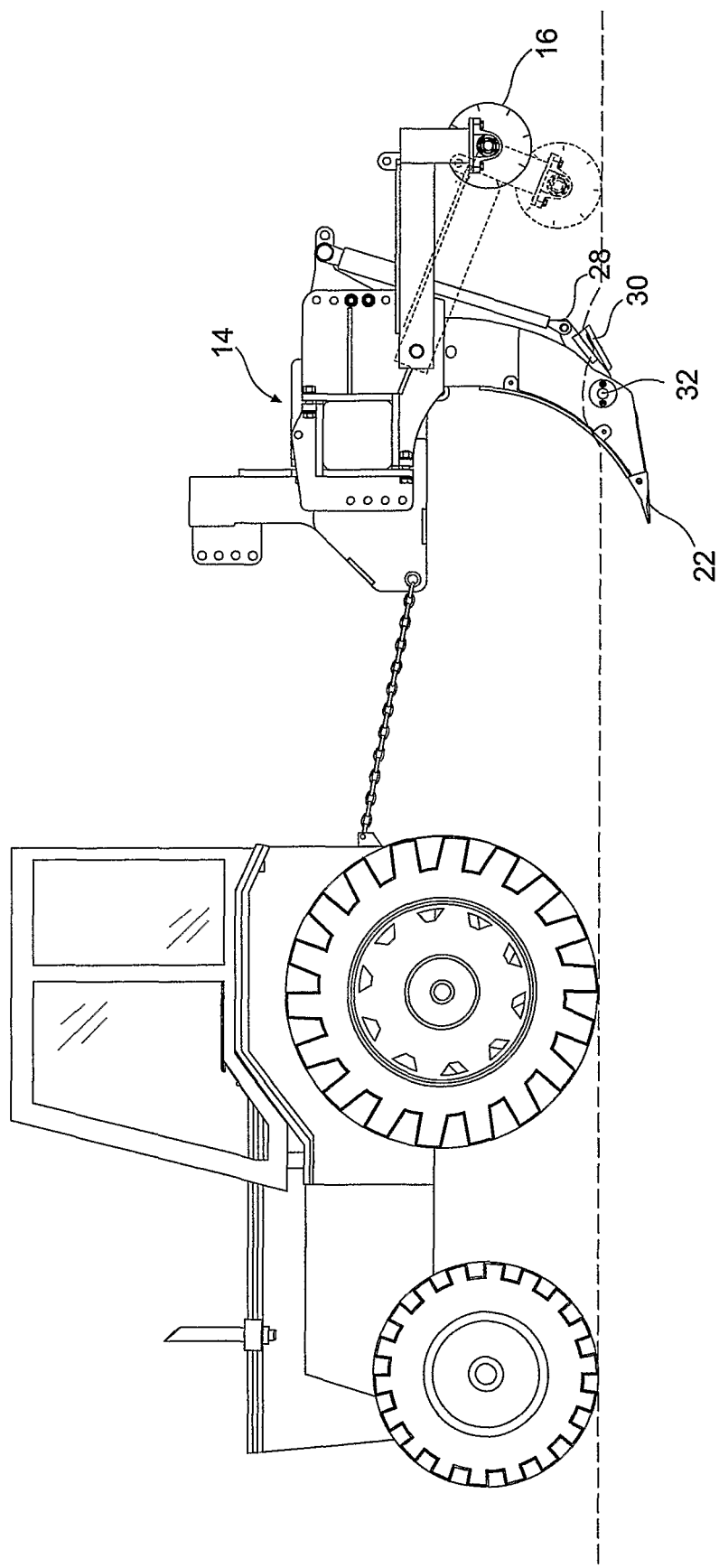
FIG. 5 illustrates in schematic view the tillage apparatus of the invention in use.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Shown in the drawings is a subsoil tool 10 in accordance with the invention. The tool 10 is operatively attached to a vehicle in the form of a tractor and is connected by a frame construction generally indicated at 14. The frame construction 14 and associated rollers 16 are to be considered incidental and do not form a part of the invention. The tool 10 of the invention is capable of being operated with alternative forms of frame construction and as such alternative forms of frame construction are to be considered as being within the scope of the invention. The subsoil tool 10 is adapted for operation at depths of up to 1.2 m below a soil surface.

The subsoil tool 10 includes a shank 18 attached at its upper end to the frame construction 14 and at its lower end the shank 16 is connected to a ripper foot 20 terminating in a ripper tooth 22.

The shank 18 is a multi part construction. Located forwardly of the shank is a wear plate 24 secured to the shank 18. The wear plate 24 has a curved "J" shaped front edge.

Behind the wear plate 24 and protected by the wear plate is a hydraulic ram 26. The ram 24 is aligned generally with the shank 16. At its lower end the ram 24 is attached to a pivot connection 28. At its upper end the ram 26 is attached to the frame construction 14. The ram 26 may actuated in response to a sensor, or, alternatively the ram 26 may be controlled by a bloc which defines the limit of travel of the ram in any direction.

The pivot connection 28 is attached to a rear end of a wing member 30. A front end of the wing member 30 is pivotally attached to the shank 16 through connection point 32. The wing member 30 extends on either side of the shank 16 and forms the soil working surface. The use of a wing member connected between the pivot connections 28 and 32 provides the ability for the interchange of wing members. Thus, during the operation of the system of the invention a wing member 30 can be selected to suit soil conditions in any specific location. Different wing members that may be attached to the shank have differing shape and lateral extent. A person skilled in the art will be able to gauge by either experience, or in some cases moderate testing, a preferred wing configuration for any selected soil conditions as determined by the soil amelioration plan generated, and from the information contained in the soil map database.

Figure 6C:
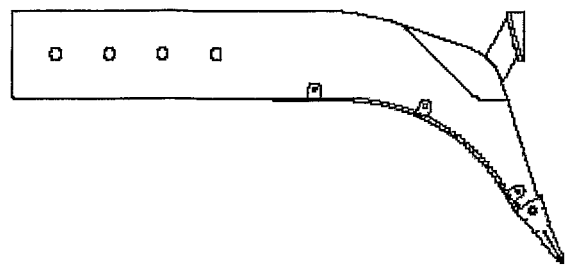
FIGS. 6a-6e show various operative tools attached to the foot of FIG. 3.
Figure 6B:
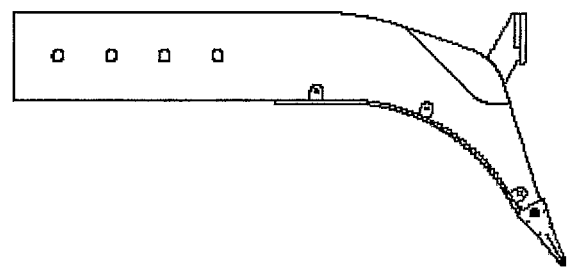
Figure 6A:
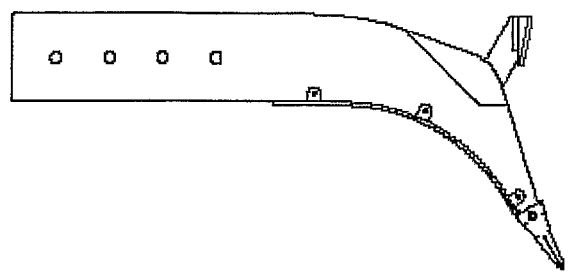
Figure 6E:
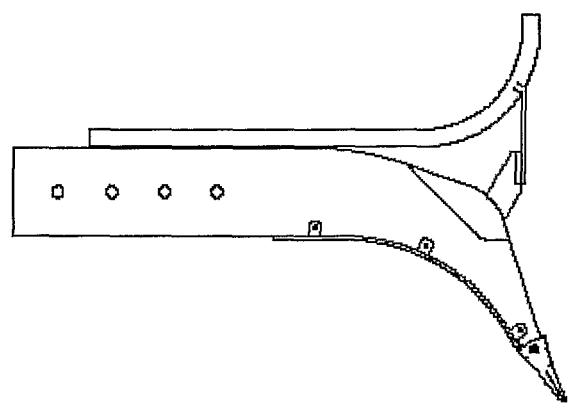
Figure 6D:
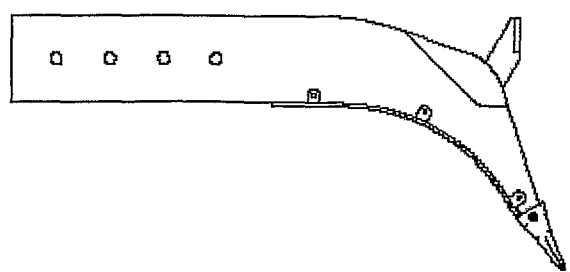

In use, the wing member 30 oscillates in a range of 5°-50°. The ram 26 includes control equipment that allows the amplitude and frequency of the oscillation to be varied according to any preferred conditions for any particular soil type and wing configuration. FIGS. 6a, 6b and 6c illustrate a variety of wings that may be used in the soil cultivation using the tool and system of the present invention. FIG. 6a represents a typical wing that might be selected as a default option; FIG. 6b illustrates a flatter wider wing that is useful in some circumstances; and FIG. 6c illustrates a wing having an upturned end piece useful as a delving wing. When the wing is removes the tool 10 has the appearance shown in FIG. 6d. Additionally tools used in other circumstances as illustrated in FIG. 6e, may be attached to the foot.

A further aspect of the invention is the use of the tool 10 as a tool carrier. The tool carrier is illustrated in FIGS. 6a-6e. In this case the wing member 30 is replaced with a variety of tools that may perform additional purposes.

Thus, during the operation of the invention an area of ground to be treated is first surveyed using conventional surveying techniques. A plurality of soil profiles at predetermined intervals in an array over an area of soil to be cultivated. By combining together the soil profile with information relating to the position at which each separate piece of information is gathered a soil map database is created for the area under cultivation. Knowledge of the soil conditions over the area to be cultivated allows a treatment and cultivation regime for the area based on the soil map database.

The cultivation regime is then carried out with the use of the tool 10. The selection of appropriate wing members 30 for different portions of any area of soil under cultivation is easily achieved and, furthermore the oscillation pattern selected for any area of ground is easily recorded together with the particular wing selected and soil profile conditions.

The system of tillage management is conveniently operated with subsoil tools as described. However, it is also possible to conduct this process with alternative equipment, such as described in WO03/024193 and the use of the method with alternative equipment is to be taken as being comprehended by the present invention.

Over time, as the area of ground is cultivated, the soil profile characteristics are remeasured and it is possible to store further soil profile characteristics of each of the soil profiles into the soil map database to thereby establish an historical cultivation record for the area of soil to be cultivated. Thus, crop yield information is added to the soil map database, and, where considered necessary or desirable an amended soil amelioration plan may be generated, varying the initial amelioration plan, which in subsequent seasons encourages continuous improvement in crop yield and uniformity.

Thus recorded further characteristics for each soil profile can be used to determine any adjusted treatment and cultivation regimes across the area under cultivation, whereby recorded soil profile data is supplied to soil working equipment so as to adjust and optimize the operation of soil working equipment in real time.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A method and system of tillage and tillage management that includes the steps of
    establishing a plurality of soil profiles at pre-determined intervals in an array over an area of soil to be cultivated;
    combining the plurality of soil profiles for the area with positional information to thereby create a soil map database;
    using the soil map database to establish a treatment and cultivation regime, in the form of a soil amelioration plan, for the area based on the soil map database; and
    cultivating the ground in accordance with the soil amelioration plan; and
    recording the cultivation in the soil map database;
    a subsoil tool adapted for carrying out the method and system of tillage and tillage management, said subsoil tool being adapted for connection to a support vehicle, said subsoil tool having
    a shank, said shank having at an upper end thereof means for connection to the support vehicle and at a lower end thereof, the shank being connected to a ripper foot terminating in a ripper tooth.

2. A method and system of tillage and tillage management according to claim 1, characterized by the further step of adding crop yield information to the soil profile and positional information in the soil map database, optionally generating an amended soil amelioration plan to be carried out in a subsequent season.

3. A method and system of tillage and tillage management according to claim 1 wherein, soil information includes the information relating to physical, chemical and environmental factors that affect soil performance, both at a surface and a sub surface level.

4. A method and system of tillage and tillage management according to claim 1, wherein soil information includes information relating to soil types, identifies any potential problems in the soil that require attention or amelioration to thereby improve soil characteristics and soil uniformity across a cultivated area.

5. A method and system of tillage and tillage management according to claim 1, wherein soil information includes manipulation of data in three dimensions recording not only soil surface characteristics, but also variation of those characteristics with depth.

6. A method and system of tillage and tillage management according to claim 1, wherein soil information further includes the ability to record and recall historical treatment and cultivation regimes for an area of soil under cultivation.

7. A method and system of tillage and tillage management according to claim 1, wherein recorded treatment and cultivation regime data includes information relating to soil working implements and types used fertilizer applications data, and crop yields or production data.

8. A method and system of tillage and tillage management according to claim 1, wherein the system is adapted for customization to record data as selected by and end user.

9. A subsoil tool adapted for carrying out the method and system of tillage and tillage management, according to claim 1, said subsoil tool further having
    a hydraulic ram, said hydraulic ram being attached to the shank, and said hydraulic ram being attached at a lower end thereof to a first pivot connection and at an upper end the hydraulic ram being attached to an actuator means;

wherein the first pivot connection at the lower end of the hydraulic ram is attached to a rear end of a laterally extending wing member, a front end of the wing member being pivotally attached to the shank through a second pivot point, whereby the wing member is oscillated in response to actuation of the hydraulic ram, and wherein the wing member is removable, and wherein a wing member is selected in accordance with an established soil profile at any position on a soil map database.

10. A subsoil tool according to claim 9, characterized in that the wing member extends on either side of the shank and forms the soil working surface.

11. A subsoil tool according to claim 9, characterized in that, the wing member oscillates in a range of 5° -50° and wherein the hydraulic ram includes control equipment that allows the amplitude and frequency of the oscillation to be varied according to any conditions for any particular soil type and wing configuration.

12. A subsoil tool according to claim 9, characterized in that the wing is selectively replaceable by alternative tool members.

* * * * *